United States Patent
Cho

(10) Patent No.: US 9,832,845 B2
(45) Date of Patent: Nov. 28, 2017

(54) LIGHTING CONTROL SYSTEM AND LIGHTING CONTROL METHOD THEREOF

(71) Applicant: SAMSUNG ELECTRONICS CO., LTD., Suwon-si (KR)

(72) Inventor: Ho Chan Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/234,453

(22) Filed: Aug. 11, 2016

(65) Prior Publication Data

US 2017/0142810 A1 May 18, 2017

(30) Foreign Application Priority Data

Nov. 18, 2015 (KR) .................. 10-2015-0162155

(51) Int. Cl.
*H05B 37/00* (2006.01)
*H05B 37/02* (2006.01)
(Continued)

(52) U.S. Cl.
CPC ....... *H05B 37/0272* (2013.01); *H04L 63/083* (2013.01); *H04W 12/06* (2013.01); *H04W 12/08* (2013.01); *H05B 33/0845* (2013.01); *H05B 33/0857* (2013.01); *F21K 9/232* (2016.08); *F21K 9/235* (2016.08); *F21K 9/238* (2016.08);
(Continued)

(58) Field of Classification Search
CPC ............ H05B 37/0272; H05B 33/0854; H05B 37/0227; H05B 33/0803; H05B 33/0845; H05B 37/0281; H05B 33/0809; H05B 33/0815; H05B 33/0842; H05B 37/03; H05B 33/0872; H05B 33/089; H05B 37/0218; H05B 33/00
See application file for complete search history.

(56) References Cited

U.S. PATENT DOCUMENTS 6,372,608 B1 4/2002 Shimoda et al.
6,645,830 B2 11/2003 Shimoda et al.
(Continued)

FOREIGN PATENT DOCUMENTS

KR 10-2014-0046778 A 4/2014
KR 10-1416175 B1 7/2014
(Continued)

*Primary Examiner* — Monica C King
(74) *Attorney, Agent, or Firm* — Sughrue Mion, PLLC

(57) ABSTRACT

A lighting device included in a network of a plurality of lighting devices includes: a lighting unit; a communication interface configured to receive a control signal generated at an external device directly from the external device or by way of another lighting device in the network, depending on a connection relationship between the plurality of lighting devices; a memory configured to store information about the lighting device; and a controller configured to, according to the control signal and the information about the lighting device, selectively perform one of controlling an operation of the lighting unit and relaying the control signal to at least one other lighting device in the network through the communication interface to control an operation of at least one target lighting device included in the network. Here, the at least one other lighting device itself may be the at least one target lighting device.

27 Claims, 10 Drawing Sheets

(51) Int. Cl.
   *H05B 33/08* (2006.01)
   *H04L 29/06* (2006.01)
   *H04W 12/08* (2009.01)
   *H04W 12/06* (2009.01)
   *F21Y 115/10* (2016.01)
   *F21V 29/74* (2015.01)
   *F21V 7/04* (2006.01)
   *F21V 19/00* (2006.01)
   *F21K 9/235* (2016.01)
   *F21K 9/232* (2016.01)
   *F21K 9/238* (2016.01)
   *F21K 9/272* (2016.01)
   *F21K 9/278* (2016.01)
   *F21V 23/00* (2015.01)

(52) U.S. Cl.
   CPC .............. *F21K 9/272* (2016.08); *F21K 9/278* (2016.08); *F21V 7/04* (2013.01); *F21V 19/006* (2013.01); *F21V 23/003* (2013.01); *F21V 29/74* (2015.01); *F21Y 2115/10* (2016.08)

(56) References Cited

U.S. PATENT DOCUMENTS

| | | |
|---|---|---|
| RE38,466 E | 3/2004 | Inoue et al. |
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,288,758 B2 | 10/2007 | Sherrer et al. |
| 7,319,044 B2 | 1/2008 | Han et al. |
| 7,501,656 B2 | 3/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,399,944 B2 | 3/2013 | Kwak et al. |
| 8,432,511 B2 | 4/2013 | Jeong |
| 8,459,832 B2 | 6/2013 | Kim |
| 8,502,242 B2 | 8/2013 | Kim |
| 8,536,604 B2 | 9/2013 | Kwak et al. |
| 8,735,931 B2 | 5/2014 | Han et al. |
| 8,742,694 B2 | 6/2014 | Bora et al. |
| 8,766,295 B2 | 7/2014 | Kim |
| 2012/0057518 A1 | 3/2012 | Herrala et al. |
| 2014/0300293 A1 | 10/2014 | Ruan et al. |
| 2015/0147067 A1 | 5/2015 | Ryan et al. |
| 2015/0173156 A1 | 6/2015 | Pederson et al. |
| 2017/0064169 A1* | 3/2017 | Mishra ................ H04N 5/2354 |

FOREIGN PATENT DOCUMENTS

| | | |
|---|---|---|
| KR | 10-2014-0122909 A | 10/2014 |
| KR | 10-2015-0051842 A | 5/2015 |

* cited by examiner

LIGHTING CONTROL SYSTEM AND LIGHTING CONTROL METHOD THEREOF

CROSS-REFERENCE TO THE RELATED APPLICATION

This application claims priority from Korean Patent Application No. 10-2015-0162155, filed on Nov. 18, 2015 in the Korean Intellectual Property Office, the disclosure of which is incorporated herein in its entirety by reference.

BACKGROUND

Apparatuses and methods consistent with exemplary embodiments of the inventive concept relate to a lighting control system and a light control method thereof.

In general, incandescent lamps or fluorescent lamps have been principally used as indoor and outdoor lighting devices. Since the effective lifespans of such incandescent lamps or fluorescent lamps are relatively short, there is a problem in that they should be frequently replaced.

In order to address such a problem, lighting fixtures to which light emitting diodes (LEDs) having excellent controllability, rapid response rates, high electricity to light conversion efficiency, long lifespans, low power consumption, and a high degree of brightness characteristics are applied have been developed. Since LEDs have relatively high levels of photoelectric conversion efficiency, power consumption thereof is low. Further, since light emissions from LEDs are not thermal light emissions, a preheating time is not necessary, and thus, on and off speeds are fast.

In addition, since gas or filaments are not used in LEDs, LEDs have positive attributes in that, since a direct-current lighting scheme having high impact resistance and safe and stabilized characteristics is used, power consumption is low, high degrees of repetition and pulse operations may be performed, and fatigue of optic nerves may be reduced. Further, LEDs have semi-permanent usage lifespans, various colors of illumination effects, and miniaturization obtained by using relatively small-sized light sources.

On the other hand, various demands for illumination by users have increased. As an example, an existing lighting scheme in which single color lighting has been used as a predetermined degree of brightness has been required to be changed to a scheme in which lighting having various colors may be used and adjusted to have various degrees of brightness in one space. Further, demand for controlling a plurality of lighting devices present in positions remote from a predetermined position has been increasing by moving away from an existing scheme in which various types of lighting devices distributed in wide living spaces are controlled by a user directly visiting the spaces corresponding thereto.

SUMMARY

Exemplary embodiments of the present inventive concept may provide a lighting control system able to control a plurality of lighting devices and a lighting control method thereof.

The exemplary embodiments may overcome the above disadvantages and other disadvantages not described above. However, the exemplary embodiments are not required to overcome these disadvantages, and may not overcome any of the problems described above.

According to an exemplary embodiment, there is provided a lighting device included in a network which is constituted by a plurality of lighting devices. The lighting device may include: a lighting unit; a communication interface configured to receive a control signal generated at an external device directly from the external device or by way of another lighting device in the network, depending on a connection relationship between the plurality of lighting devices; a memory configured to store information about the lighting device; and a controller configured to, according to the control signal and the information about the lighting device, selectively perform one of controlling an operation of the lighting unit and relaying the control signal to at least one other lighting device in the network through the communication interface to control an operation of at least one target lighting device included in the network. Here, the at least one other lighting device itself may be the at least one target lighting device. The network may be a mesh network, and the control signal may be directly received at the communication interface from the external device using a Bluetooth™ low energy protocol.

If the control signal indicates the control signal is directed to the lighting device, the controller may control the operation of the lighting device, and if the control signal indicates that the control signal is directed to the at least one target lighting device, the controller relays the control signal to the at least one other lighting device.

The operation of the lighting unit or the at least one target lighting device may include adjusting at least one of color, color temperature, brightness and chroma of light emitted from the lighting unit or a lighting unit of the at least one target lighting device, respectively.

The memory may store identification information about the lighting device, and the controller may transmit the identification information to the external device through the communication interface for the external device to identify the lighting device.

The controller may relay identification information about the at least one other lighting device to the external device through the communication interface for the external device to identify the at least one other lighting device.

The communication interface may receive the control signal directly from the external device using a data channel, and receive the control signal by way of the other lighting device using an advertising channel different from the data channel.

The memory may further store a password required for another external device to use to access the lighting device to control the operation of the lighting unit or another lighting device included in the network, the password being received from the external device.

The information about the lighting device may include group identification information about a group of the lighting device and another lighting device included in the network, the group identification information being generated by the external device. The controller may determine whether the control signal is directed to the group to control an operation of the group or another group of the at least one target lighting device to control an operation of the other group.

When control signals are received from a plurality of external devices including the external device, the controller may select the control signal generated at the external device, among the control signals, to selectively perform one of the controlling the operation of the lighting unit and the relaying the control signal to the at least one other lighting device based on priority information set to each of the plurality of external devices and stored in the memory.

According to an exemplary embodiment, there is provided a method of controlling at least one lighting device in a network which may be constituted by a plurality of lighting devices. The method may include: receiving, at a lighting device included in the network, a control signal generated at an external device directly from the external device or by way of another lighting device included in the network, depending on a connection relationship between the plurality of lighting devices; storing information about the lighting device in a memory of the lighting device; and according to the control signal and the information about the lighting device, selectively performing one of controlling an operation of the lighting device and relaying the control signal to at least one other lighting device in the network through the communication interface to control an operation of at least one target lighting device included in the network.

According to an exemplary embodiment, there is provided a non-transitory computer readable medium having recorded thereon instructions executable by a processor of an external device to perform a method comprising: searching for a lighting device in a network constituted by a plurality of lighting devices which is to be connected to the external device; generating a control signal which selectively controls an operation of the lighting device or an operation of at least one target lighting device included in the network; and transmitting the control signal directly to the lighting device.

According to various exemplary embodiments as described above, a plurality of lighting devices in a network may be controlled by an external device such as a smartphone connected to the network.

Additional and/or other aspects and advantages of the exemplary embodiments will be set forth in part in the description which follows and, in part, will be obvious from the description, or may be learned by practice of the exemplary embodiments.

BRIEF DESCRIPTION OF THE DRAWINGS

The above and other aspects, features, and advantages of the exemplary embodiments will be more clearly understood from the following detailed description taken in conjunction with the accompanying drawings, in which.

DETAILED DESCRIPTION OF THE EXEMPLARY EMBODIMENTS

Figure 1:
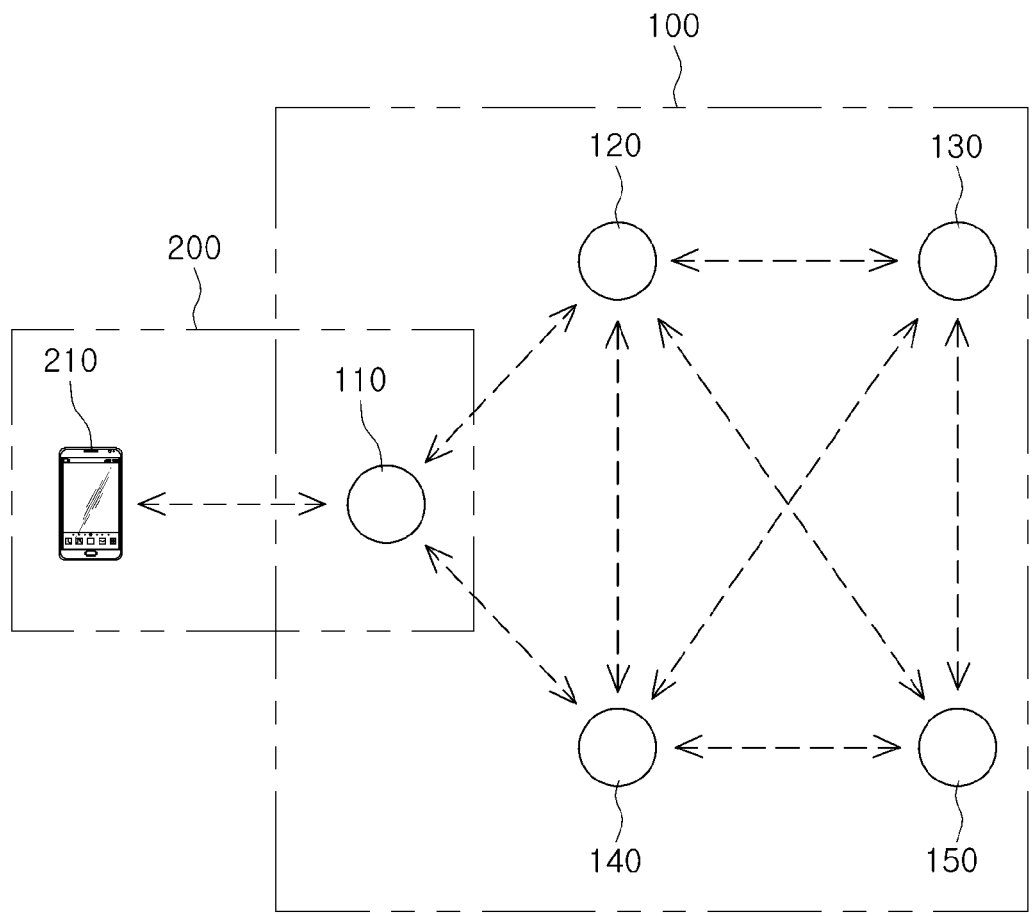
FIG. 1 is a layout diagram of a lighting control system according to an example embodiment.

Various exemplary embodiments will now be described more fully with reference to the accompanying drawings. These embodiments may, however, be changed or modified in different forms and should not be construed as limited thereto. Rather, these embodiments are provided such that the disclosures thereof are thorough and complete and fully convey the inventive concept to those skilled in the art. In the drawings, the sizes and relative sizes of layers and regions may be exaggerated for clarity.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "over," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Meanwhile, when an exemplary embodiment can be implemented differently, functions or operations described in a particular block may occur in a different way from a flow described in the flowchart. For example, two consecutive blocks may be performed simultaneously, or the blocks may be performed in reverse according to related functions or operations.

Figure 2:
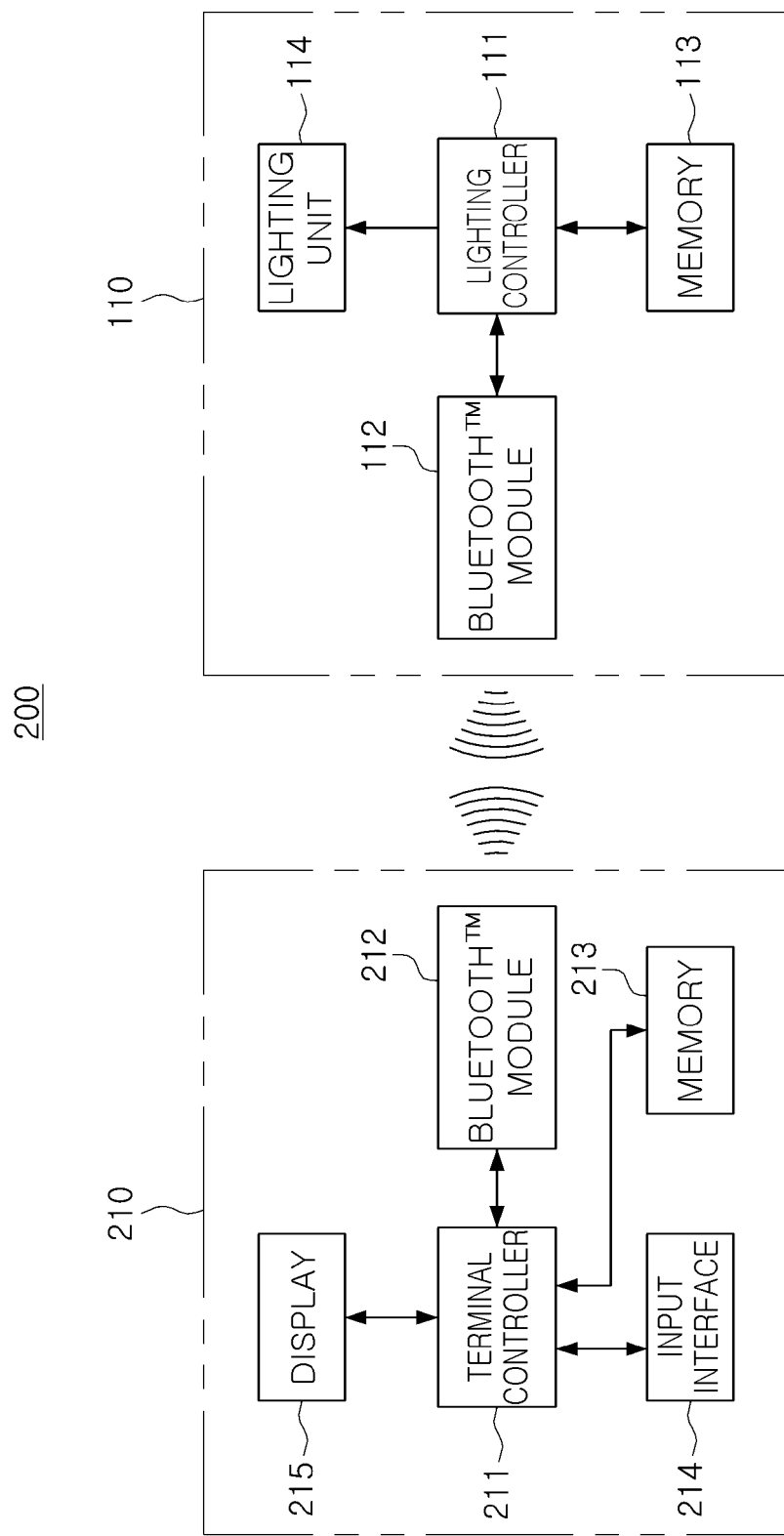
FIG. 2 is a block diagram of a lighting device and a terminal of FIG. 1, according to an exemplary embodiment.

FIG. 1 is a layout diagram of a lighting control system according to an example embodiment. FIG. 2 is a block diagram of a lighting device and a terminal illustrated in FIG. 1.

As illustrated in FIG. 1, a lighting control system 10 according to an example embodiment may include a plurality of lighting devices 110 to 150 configuring a mesh network 100. The mesh network 100 may be configured by using the plurality of lighting devices 110 to 150 as mesh nodes. A connection of the mesh network 100 may be implemented via a terminal 210. Thus, the terminal 210 may have a control connection to an optional lighting device configuring the mesh network 100, to be able to control the entirety of the lighting devices 110 to 150 configuring the mesh network 100. The lighting device 110 connected to the terminal 210 may serve as, for example, a bridge for a connection of the terminal 210 to the mesh network 100 and may also serve as a lamp providing illumination.

With reference to FIG. 2, each of the lighting devices 110 to 150 may include a lighting controller 111, a Bluetooth™ module 112, a memory 113, and a lighting unit 114. Here, the Bluetooth™ module 112 is merely an example communication interface, and thus, may be replaced with an equivalent device or module.

The lighting controller 111 may process a control signal received through the Bluetooth™ module 112 to store the processed control signal in the memory 113, and may control the lighting unit 114, based on a data signal generated based on the control signal and stored in the memory 113.

The Bluetooth™ module 112 may transmit and receive a Wireless Bluetooth™ signal, based on the Bluetooth™ Low Energy (BLE) protocol. The Bluetooth™ module 112 may configure a mesh network in which respective Bluetooth™ modules perform host and network routing functions, based on the BLE protocol.

The mesh network may be provided by implementing a plurality of mesh nodes as a wireless communications network provided in a mesh form. Respective mesh nodes may communicate with different mesh nodes to form a wireless communications network. Thus, information in the network may be smoothly routed via mesh nodes, and other mesh nodes may be freely added thereto. In an example embodiment, the lighting devices 110 to 150 may respectively serve as mesh nodes.

Thus, the lighting controller 111 may configure a mesh network including the plurality of lighting devices 110 to 150 using the Bluetooth™ module 112. Since the lighting device 110 configures the mesh network 100, a network may be smoothly configured, even in a case in which a new lighting device 110 is added or a portion of existing lighting devices 110 to 150 is removed.

The memory 113 may store a program for data processing and control of the lighting controller 111 therein and also perform a function of temporary storage of input or output data. The memory 113 may store a universally unique identifier (UUID) which is a unique identification code of the lighting device 110 therein. The UUID may be a device address identifying the lighting device 110. The UUIDs may be randomly generated using device IDs such as separate serial numbers that are provided to respective lighting devices 110 to 150 when the lighting devices 110 to 150 are manufactured. When the lighting devices 110 to 150 are respectively turned on, the UUIDs may be randomly generated, based on device IDs, to thus store the generated UUIDs in respective memories 113.

As the memory 113, various types of storage devices such as a flash memory type storage device, a hard disk type storage device, and the like, may be used. A flash memory may be used in an example embodiment.

As the lighting unit 114, any light emitting device capable of emitting light when an electrical signal is applied thereto may be used. For example, a light emitting diode (LED) may be used. Here, in the case of the LED, at least one LED may be used. The lighting unit 114 may be controlled by the lighting controller 111, and may change a color, a color temperature, a degree of brightness of light, or light chroma in response to a control signal of the lighting controller 111.

As the terminal 210, any information technology (IT) device that is portable by a user, such as a smartphone, a mobile phone, a laptop computer, or an MP3 player, and that is capable of undertaking communications based on the BLE protocol may be used. As the terminal 210, a plurality of terminals may be employed, and respective terminals may simultaneously access the mesh network, without having priority. In a different manner, according to an example embodiment, priority may be provided to a plurality of terminals. Information about the priority may be stored in the memory 113 of each of the lighting devices 110 to 150. An example embodiment illustrates a case in which the terminal 210 is a smartphone, by way of example.

The terminal 210 may include a terminal controller 211, a Bluetooth™ module 212, a memory 213, and a display 215. The terminal 210 may further include an input interface 214 allowing for an input of a command thereto.

The terminal controller 211 may execute a program for generation of a control signal controlling the lighting device 110, and may control a connection with the lighting device 110. The terminal controller 211 may retrieve a unique identification code of the lighting device 110 through the Bluetooth™ module 212, and may detect a received signal strength indicator (RSSI) value of a wireless Bluetooth™ signal received from the lighting device 110 via Bluetooth™.

The Bluetooth™ module 212 may transmit and receive a Wireless Bluetooth™ signal, based on the BLE protocol. The Bluetooth™ module 212 may transmit a control signal to the Bluetooth™ module 112 of the lighting device 110, based on the BLE protocol, and may also receive information transmitted by the Bluetooth™ module 112 of the lighting device 110.

The input interface 214 may generate key input data from key inputs input by a user to control operations of the terminal 210. The input interface 214 may be configured by various input devices such as a key pad, a dome switch, a touch pad, a jog wheel, a jog switch, a finger mouse, and the like. In detail, a touch pad may form a layer structure together with the display 215 described below to thus configure a touch screen.

As the memory 213, various types of storage devices such as a flash memory type storage device, a hard disk type storage device, and the like, may be used, and according to an example embodiment, a flash memory may be used. A program for data processing and control operations of the terminal controller 211 may be stored in the memory 213, and input or output data may also be temporarily stored in the memory 213.

The display 215 may output information processed by the terminal 210 as visual information perceptible to a user. For example, when the terminal 210 is a smartphone, the display 215 may display a user interface (UI) or a graphic user interface (GUI) relevant to the smartphone. In a different manner, as described above, when the display 215 and the input interface 214 configure a touchscreen, the display 215 may also serve as the input interface. For example, when the display 215 is configured as a touchscreen, the display 215 may include a touchscreen panel, a touchscreen panel controller, and the like.

Figure 3:
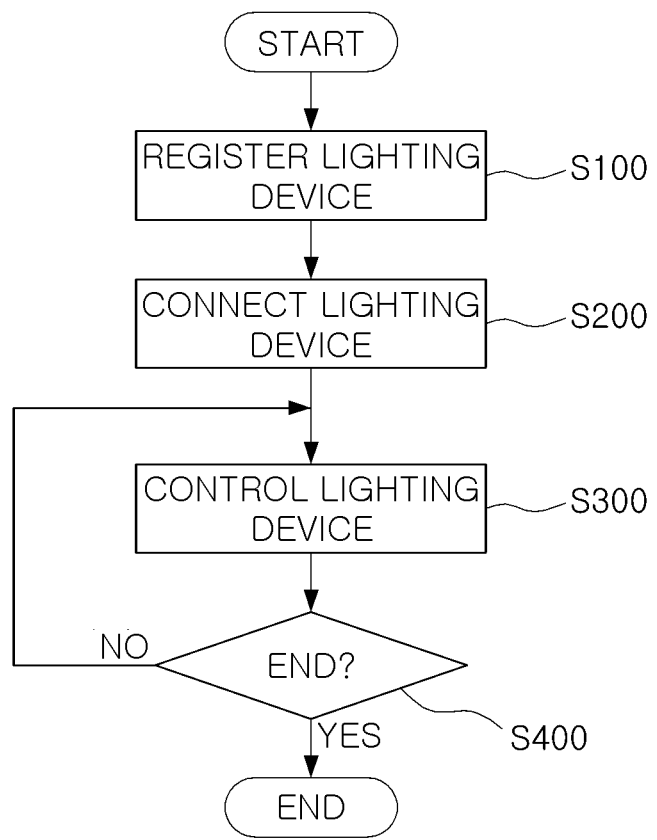
FIG. 3 is a flowchart illustrating a lighting control method according to an example embodiment.
Figure 4:
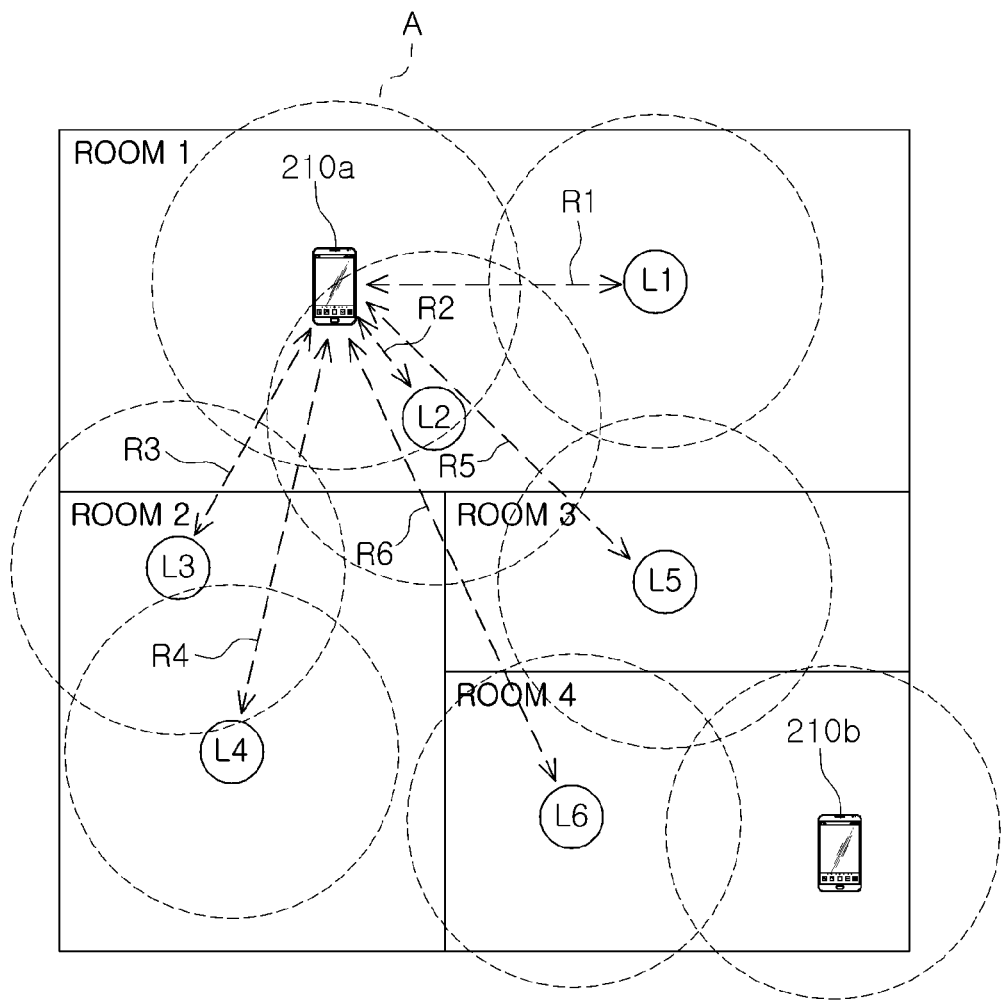
FIG. 4 is a drawing illustrating a lighting control method of the lighting control system of FIG. 1, according to an exemplary embodiment.
Figure 5:
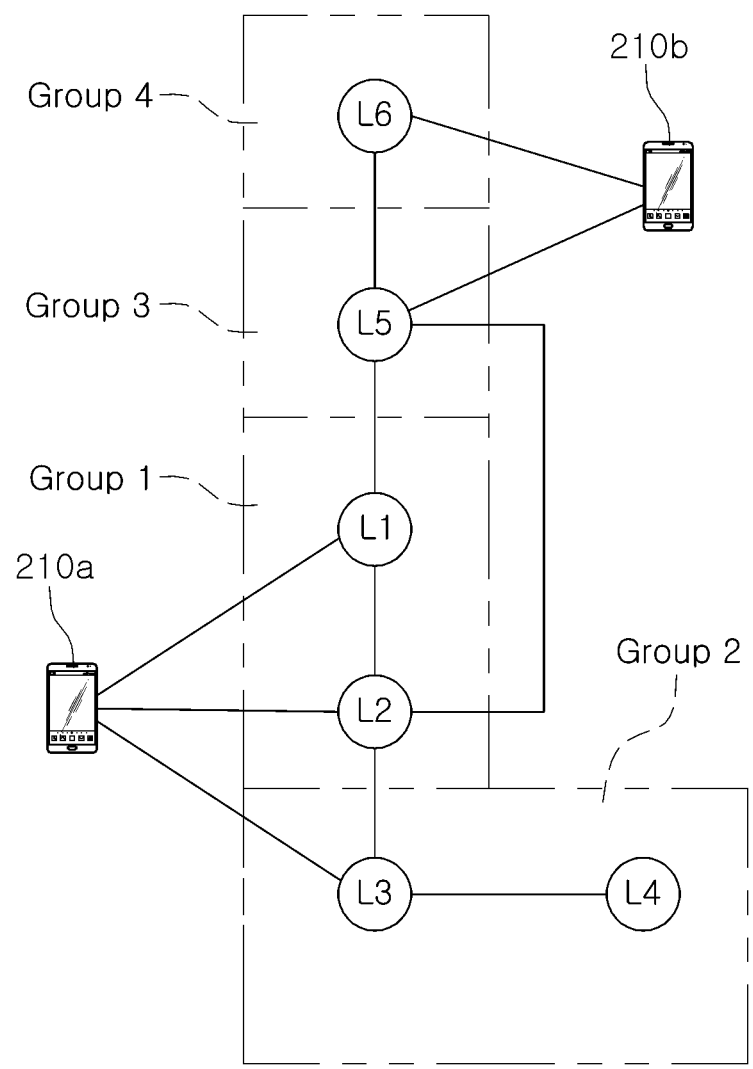
FIG. 5 is a drawing illustrating connection relationships within the lighting control system of FIG. 4, according to an exemplary embodiment.

With reference to FIGS. 3 to 5, a lighting control method according to an example embodiment will be described below. FIG. 3 is a flowchart illustrating a lighting control method according to an example embodiment. FIG. 4 is a drawing illustrating a lighting control method of a lighting control system of FIG. 1, while FIG. 5 is a drawing illustrating connection relationships within the lighting control system.

With reference to FIG. 3, the lighting control method according to an example embodiment may include registering a lighting device in S100, establishing a connection of the lighting device in S200, controlling the lighting device in S300, and finishing controlling the lighting device in S400.

First, with reference to FIG. 4, operation S100 of registering the lighting device will be described.

FIG. 4 is a plan view of a residential space configured of four rooms, ROOM1 to ROOM4. In ROOM1, a first lighting device L1 and a second lighting device L2 may be provided, and in ROOM2, a third lighting device L3 and a fourth lighting device L4 may be provided. In ROOM3, a fifth lighting device L5 may be provided, and in ROOM4, a sixth lighting device L6 may be provided. Hereinafter, a case in which a first terminal 210a and a second terminal 210b are provided in the residential space will be described by way of example. Reference letter A indicates an available communications region in which wireless signals can be transmitted and received between the first terminal 210a and the first to third lighting devices L1 to L3.

For example, first, when the first to sixth lighting devices L1 to L6 are provided in ROOM1 to ROOM4 and are turned on, these lighting devices may generate unique identification codes and store the generated identification codes in memories included in the lighting devices, respectively. The first terminal 210a provided in ROOM1 may retrieve unique identification codes of the first lighting device L1, the second lighting device L2, and the third lighting device L3 disposed in the available communications region A. In addition, the first terminal 210a may retrieve unique identification codes of the fourth to sixth lighting devices L4 to L6, not present in the available communications region, through a mesh network configured by the first to sixth lighting devices L1 to L6. Referring to connection relationships within the lighting control system, illustrated in FIG. 4, the first terminal 210a may retrieve a unique identification code of the sixth lighting device L6 through the fifth lighting device L5 and the first lighting device L1. Alternatively, the first terminal 210a may retrieve the unique identification code of the sixth lighting device L6 through the fifth lighting device L5 and the second lighting device L2.

Through such a process, the first terminal 210a may retrieve unique identification codes of all of the lighting devices L1 to L6 disposed within the mesh network and may store the retrieved unique identification codes in a memory of the first terminal 210a. In this case, the first terminal 210a may select a lighting device disposed within a predetermined distance therefrom among the first to third lighting devices L1 to L3 provided in the available communications region A of the first terminal 210a to retrieve a unique identification code of the selected lighting device. Also, the first terminal 210a may compare RSSI values of wireless signals (e.g., wireless Bluetooth™ signals) received from the first to third lighting devices L1 to L3, respectively, and select a lighting device transmitting a wireless signal having an RSSI value in a predetermined reference range to retrieve a unique identification code of the selected lighting device.

In addition, from among the retrieved lighting devices, a group identification code may be provided to a portion of the retrieved lighting devices. FIG. 5 illustrates a case in which Group 1 to Group 4 are provided to the first to sixth lighting devices L1 to L6. By providing the respective group identification codes thereto, a control signal may be transmitted selectively for a respective group at a stage of controlling a lighting device.

Through such procedures, operation S100 in which the lighting devices are registered by obtaining unique identification codes of lighting devices and storing the unique identification codes in the first terminal 210a may be completed. In this case, the first terminal 210a may generate an optional password and respectively transmit the generated password to the retrieved first to sixth lighting devices L1 to L6 to be respectively stored therein. In this case, the respective first to sixth lighting devices L1 to L6 may request a terminal accessing thereto to input the password thereto. Thus, only when the password is consistent, a connection thereof may be allowed, and thus, a lighting device may be prevented from being used by an unauthorized user.

Next, operation S200 of establishing a connection of a lighting device will be described with reference to FIG. 4.

After the lighting devices L1 to L6 are registered, the registered first to sixth lighting devices L1 to L6 may be controlled by the first terminal 210a. The first terminal 210a may receive RSSI values of the registered lighting devices and compare the received values to one another, and may access a lighting device having a highest value among the RSSI values. Here, the highest RSSI value means a lighting device closest thereto in distances R1 to R6, but may not indicate a lighting device physically closest thereto, and thus, may indicate a lighting device that has a highest signal strength among the received signals. As such, the operation in which the RSSI values are received and compared to one another may be repetitively performed every preset interval to be stored in the first terminal 210a. Thus, the first terminal 210a may respectively confirm the RSSI values of the lighting devices in real time and may access a lighting device having a highest RSSI value. The example embodiment illustrates the case in which the first terminal 210a is accessed by the second lighting device L2 disposed closest to the first terminal 210a. However, the first terminal 210a may be accessed by a lighting device having a secondarily high RSSI value according to a state of a network.

A lighting device having a highest RSSI value may serve as a switch controlling the entirety of lighting devices simultaneously with operating as an illumination device. Remaining lighting devices may operate as illumination devices controlled by the switch. The example embodiment illustrates the case in which the second lighting device L2 operates as a switch, and the first lighting device L1 and the third to sixth lighting devices L3 to L6 operate as illumination devices, by way of example. For example, in a case in which the process of receiving RSSI values and comparing the received RSSI values is repetitively performed every preset interval, a lighting device operating as a switch may be a lighting device having a highest RSSI value updated every preset interval, and thus, may be changed every preset interval.

Subsequently, operation S300 of controlling a lighting device will be described below.

The first terminal 210a may transmit a control signal including a unique identification code through the second lighting device L2, and in a case in which the unique identification code included in the control signal is not or does not correspond to a unique identification code of the second lighting device L2, the second lighting device L2 may transmit, i.e., relay, a control signal to other lighting devices adjacent thereto, for example, the first lighting device L1 and the third to sixth light devices L3 to L6. For example, when the unique identification code included in the control signal is or corresponds to the unique identification code of the second lighting device L2, the first terminal 210a may control the second lighting device L2, using illumination information included in the control signal. According to an exemplary embodiment, the second lighting device L2 may receive the control signal from the first terminal 210a through a data channel, and the first lighting device L1 and the third to sixth light devices L3 to L6 may receive the control signal using an advertising channel different from the data channel.

Through such a process, the first terminal 210a may control the fourth to sixth lighting devices L4 to L6, being present outside of the available communications region A, as well as controlling the first to third lighting devices L1 to L3 being present within the available communications region A.

In addition, in a case in which the second terminal 210b is provided, the first terminal 210a and the second terminal 210b may control the first to sixth lighting devices L1 to L6 in the same manner. In addition, a control signal of one terminal among the first terminal 210a and the second terminal 210b may also have precedence over that of the remaining terminal.

Through such a process, the first and second terminals 210a and 210b may easily search all of the lighting devices L1 to L6 provided within the mesh network, register, and control the retrieved lighting devices.

Figure 6:
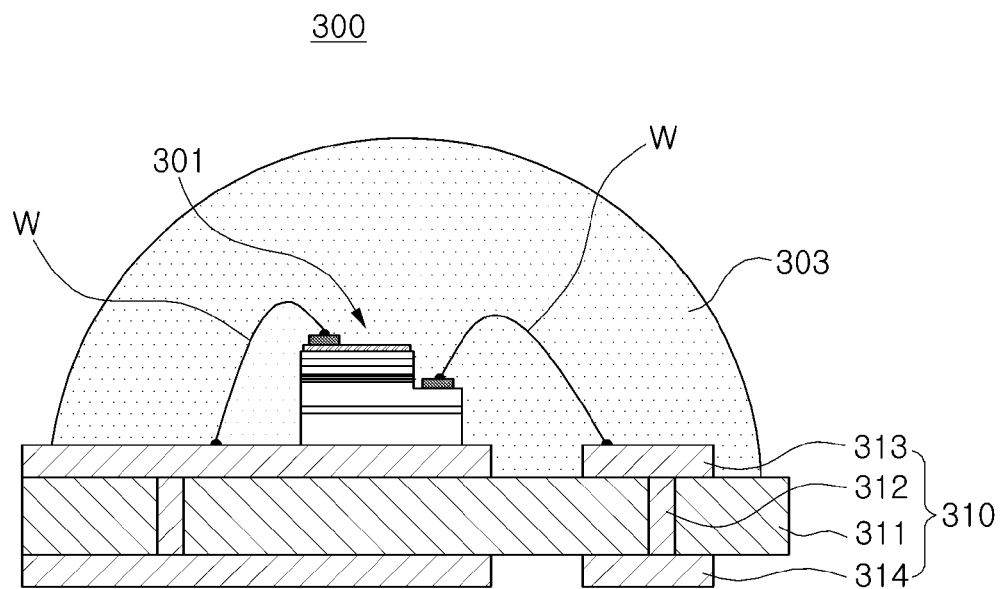
FIGS. 6 and 7 illustrate a semiconductor light emitting device package that may be employed in a lighting device of FIG. 1, according to exemplary embodiments.
Figure 7:
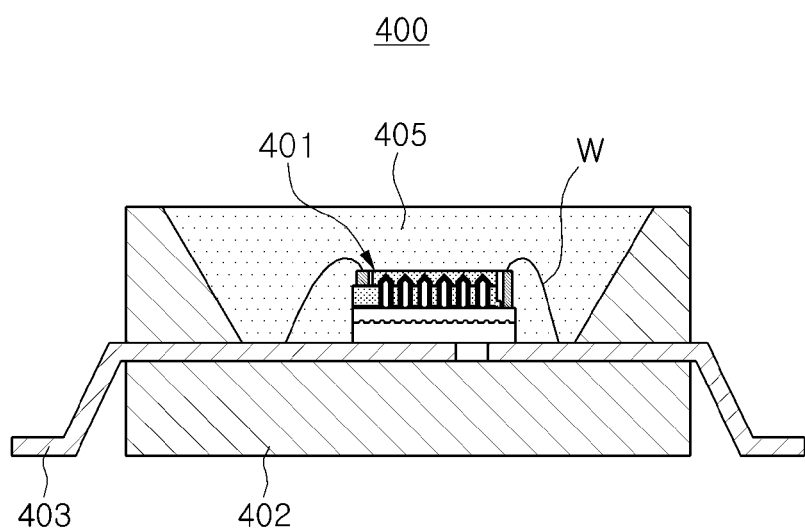

FIGS. 6 and 7 illustrate a semiconductor light emitting device package that may be employed in a lighting device of FIG. 1, according to example embodiments.

With reference to FIG. 6, a semiconductor light emitting device package 300 may include a semiconductor light emitting device 301, a mounting substrate 310, and an encapsulation body 303.

The semiconductor light emitting device 301 may be mounted on the mounting substrate 310 to be electrically connected to the mounting substrate 310 through a wire W. The mounting substrate 310 may include a substrate body 311, an upper electrode 313, a lower electrode 314, and a through electrode 312 connecting the upper electrode 313 and the lower electrode 314 to each other. A body of the mounting substrate 310 may be formed of a resin, ceramic, or a metal. The upper or lower electrode 313 or 314 may be a metal layer formed of a metal such as Au, Cu, Ag, or Al. For example, the mounting substrate 310 may be provided as a substrate such as a printed circuit board (PCB), a metal-core printed circuit board (MCPCB), an MPCB, a flexible printed circuit board (FPCB), or the like, and a structure of the mounting substrate 310 may be variously used.

An upper surface of the encapsulation body 303 may have a convex, dome-shaped lens structure, but according to an example embodiment, the surface thereof may be convex or convex, to be able to adjust an angle of beam spread in light emitted through the upper surface of the encapsulation body 303.

With reference to FIG. 7, a semiconductor light emitting device package 400 may include a semiconductor light emitting device 401, a package body 402, and a pair of lead frames 403.

The semiconductor light emitting device 401 may be mounted on the lead frames 403 in such a manner that respective electrodes are electrically connected to the lead frames via the wire W. According to an example embodiment, the semiconductor light emitting device 401 may also be mounted on other regions instead of being mounted on the lead frames 403, for example, in the package body 402. The package body 402 may have a cut shaped recess portion to improve light reflection efficiency. Such a recess portion may be provided with an encapsulation body 405 formed therein, the encapsulation portion 405 being formed of a light transmitting material to encapsulate the semiconductor light emitting device 401, the wire W, and the like. In an example embodiment, the encapsulation body 405 may contain a wavelength conversion material such as a phosphor and/or a quantum dot.

Figure 8A:
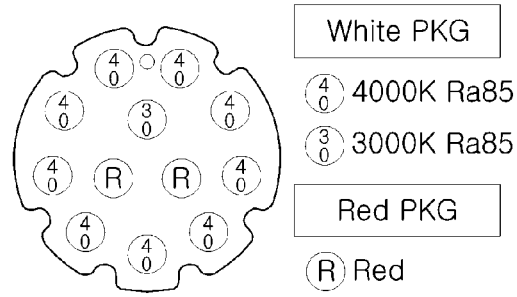
FIGS. 8A and 8B are schematic views illustrating white light source modules that may be employed in a lighting device of FIG. 1, according to exemplary embodiments.
Figure 8B:
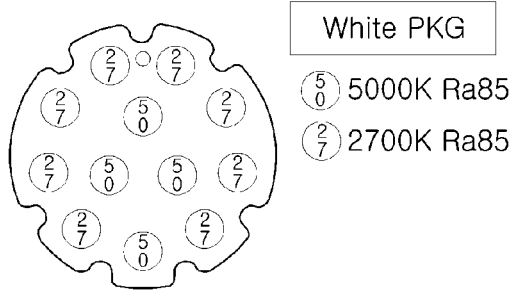

FIGS. 8A and 8B are schematic views illustrating white light source modules that may be employed in the lighting unit of the lighting device of FIG. 1, according to example embodiments.

The white light source modules illustrated in FIGS. 8A and 8B may respectively include a plurality of light emitting device packages mounted on a circuit board. The plurality of light emitting device packages mounted on a single white light source module may be configured of the same type of light emitting device packages generating light having the same wavelength or heterogeneous light emitting device packages generating light having different wavelengths.

With reference to FIG. 8A, a white light source module may be configured by combining white light emitting device packages '40' and '30' having color temperatures of 4000K and 3000K, respectively, and a red light emitting device package 'Red'. The white light source module may provide white light having a color temperature adjustable within a range of 3000K to 4000K and having a color rendering index Ra within a range of 65 to 100.

In an example embodiment, the white light source module may only be configured of a white light emitting device package. In this case, the white light source module may include a white light emitting device package emitting white light having a color temperature different from that of FIG. 8A. For example, as illustrated in FIG. 8B, the white light source module may provide white light of which a color temperature may be adjusted to be within a range of 2700K to 5000K and of which a color rendering index Ra is within a range of 85 to 99 by combining a white light emitting device package '27' having a color temperature of 2700K and a white light emitting device package '50' having a color temperature of 5000K. Here, the number of light emitting device packages having a respective color temperature may be mainly changed depending on a preset value of a basic color temperature. For example, when a lighting device has around 4000K of a preset basic value of color temperature, the number of packages corresponding to 4000K may be more than the number of packages corresponding to 3000K of color temperature or the number of red light emitting device packages.

As such, the heterogeneous light emitting device packages may be configured in such a way that at least one of violet, blue, green, red, or infrared light emitting device packages is included in a light emitting device package emitting white light by combining yellow, green, red, or orange phosphor with a blue light emitting device. Thus, a color temperature and a color rendering index (CRI) of white light may be adjusted.

The white light source module may be used as a light source module 1040 or 2300 of a lighting device 1000 or 2000 (see FIGS. 10 and 11) described below.

In a single light emitting device package, light having a required color may be determined depending on a wavelength of light from a light emitting diode (LED) chip, a light emitting device, and a phosphor type and a combination ratio of phosphors. In the case of the white light emitting device package, a color temperature and a color rendering index may be controlled thereby.

For example, when the LED chip emits blue light, a light emitting device package including at least one of yellow, green, and red phosphors may emit white light having various color temperatures according to a phosphor combination ratio. In a different manner, a light emitting device package in which a green or red phosphor is applied to a blue LED chip may emit green or red light. As such, by combining the light emitting device package emitting white light and the light emitting device package emitting green or red light, a color rendering index and a color temperature of white light may be controlled. In addition, a light emitting device package may also be configured to include at least one of light emitting devices emitting violet light, blue light, green light, red light, and infrared light.

In this case, in the lighting device, CRI may be adjusted from a level of a sodium-vapor lamp to a level of sunlight, and various types of white light having a color temperature of around 1500K to around 20000K may be generated. In addition, a lighting color may be adjusted to be appropriate for an ambient atmosphere or for viewer mood by generating violet, blue, green, red, orange visible light or infrared light as needed. Further, the lighting device may also emit light within a special wavelength band, capable of promoting plant growth.

Figure 9:
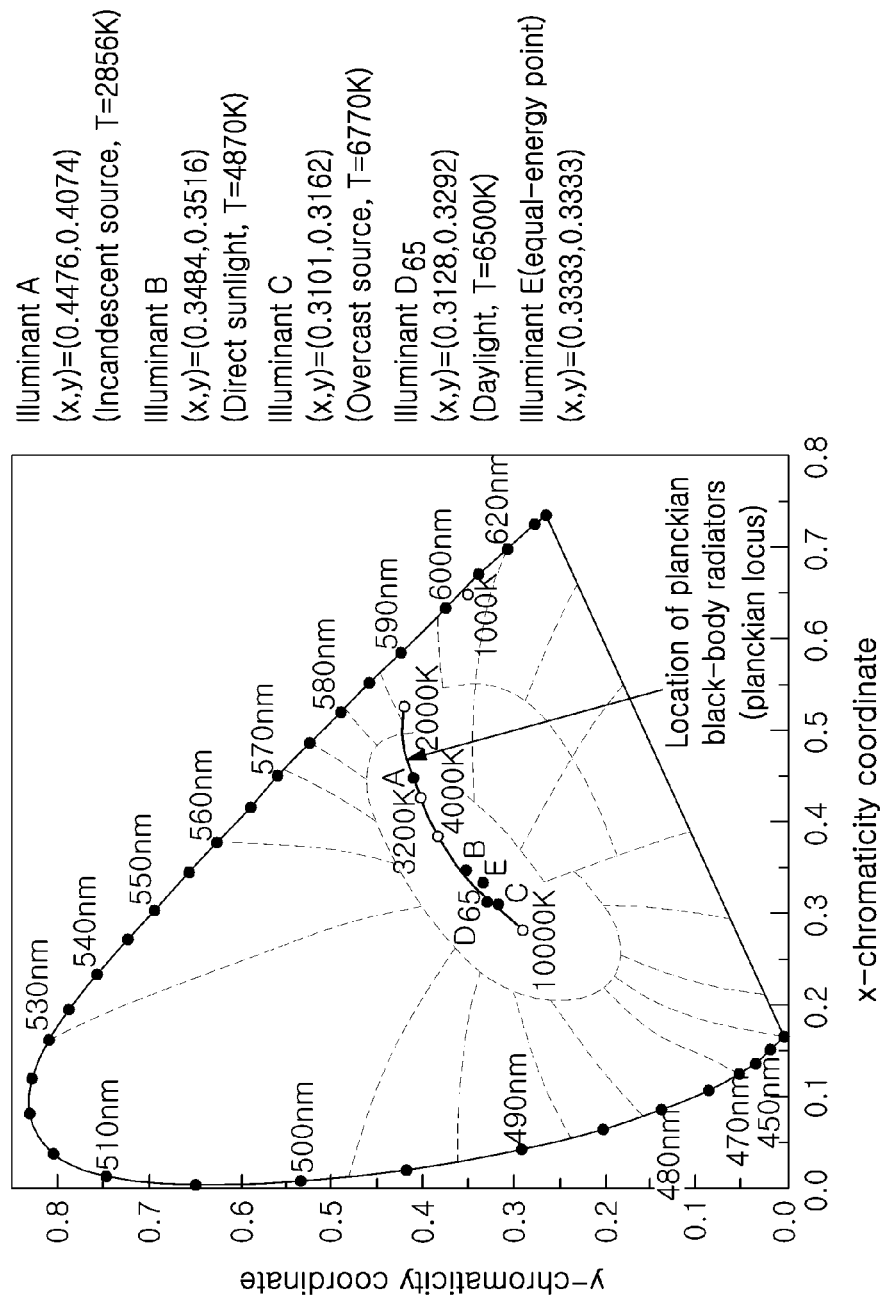
FIG. 9 is a CIE 1931 color space chromaticity diagram illustrating a wavelength conversion material that may be used in a white light source module of FIGS. 8A and 8B, according to an exemplary embodiment.

White light obtained by combining yellow, green, red phosphors and/or green and red light emitting devices with a blue light emitting device may have two or more peak wavelengths, and coordinates (x, y) of the CIE 1931 color space chromaticity diagram illustrated in FIG. 9 may be located on line segments (0.4476, 0.4074), (0.3484, 0.3516), (0.3101, 0.3162), (0.3128, 0.3292), and (0.3333, 0.3333) connected to one another. Alternatively, the coordinates (x, y) may be located in a region surrounded by the line segments and blackbody radiation spectrum. A color temperature of white light may be within a range of 1500K to 20000K. In FIG. 20, white light in the vicinity of a point E (0.3333, 0.3333) below the blackbody radiation spectrum may be in a state in which light of a yellow-based component becomes relatively weak. This white light may be used as an illumination light source of a region in which a relatively bright or refreshing mood may be provided to the naked eye. Thus, a lighting device product using white light in the vicinity of the point E (0.3333, 0.3333) below the blackbody radiation spectrum may be effective for use in retail spaces in which groceries, clothing, or the like are for sale.

As a material for conversion of wavelength of light emitted from a semiconductor light emitting device, various materials such as a phosphor and/or a quantum dot may be used.

Phosphors may be represented by the following empirical formulae and have colors as below.

Oxide-based Phosphor: Yellow and green $Y_3Al_5O_{12}$:Ce, $Tb_3Al_5O_{12}$:Ce, $Lu_3Al_5O_{12}$:Ce Silicate-based Phosphor: Yellow and green $(Ba,Sr)_2SiO_4$:Eu, yellow and yellowish-orange $(Ba,Sr)_3SiO_5$:Ce Nitride-based Phosphor: Green β-SiAlON:Eu, Yellow $La_3Si_6N_{11}$:Ce, Yellowish-orange α-SiAlON:Eu, red $CaAlSiN_3$:Eu, $Sr_2Si_5N_8$:Eu, $SrSiAl_4N_7$:Eu, $SrLiAl_3N_4$:Eu, $Ln_{4-x}(Eu_zM_{1-z})_xSi_{12-y}Al_yO_{3+x+y}N_{18-x-y}$ (0.5≤x≤3, 0<z<0.3, 0<y≤4)(Here, Ln may be at least one element selected from a group consisting of group IIIa elements and rare-earth elements, and M may be at least one element selected from a group consisting of calcium (Ca), barium (Ba), strontium (Sr), and magnesium (Mg).

Fluoride-based Phosphor: KSF-based red $K_2SiF_6$:$Mn^{4+}$, $K_2TiF_6$:$Mn^{4+}$, $NaYF_4$:$Mn^{4+}$, $NaGdF_4$:$Mn^{4+}$, $K_3SiF_7$:$Mn^{4+}$ A composition of phosphor should basically coincide with stoichiometry, and respective elements may be substituted with other elements in respective groups of the periodic table of elements. For example, Sr may be substituted with Ba, Ca, Mg, or the like, of an alkaline earth group II, and Y may be substituted with lanthanum-based terbium (Tb), lutetium (Lu), scandium (Sc), gadolinium (Gd), or the like. In addition, Eu or the like, an activator, may be substituted with cerium (Ce), Tb, praseodymium (Pr), erbium (Er), ytterbium (Yb), or the like, according to a required energy level. In this case, an activator may be used alone, or a sub-activator or the like, for modification of characteristics thereof, may additionally be used.

In detail, in the case of a fluoride-based red phosphor, in order to improve reliability thereof at a relatively high temperature/high humidity, a phosphor may be coated with a fluoride not containing manganese (Mn), or a phosphor surface or a fluoride-coated surface of phosphor coated with a fluoride not containing Mn may further be coated with an organic material. In the case of the fluoride-based red phosphor as described above, a narrow full width at half maximum of 40 nm or less may be obtained in a manner different from the case of other phosphors, and thus, the fluoride-based red phosphor may be used in high-resolution TV sets such as UHD TVs.

The following table 1 illustrates phosphor types of white light emitting devices using a blue LED chip (440 to 460 nm) or a UV LED chip (380 to 440 nm) for each application field.

TABLE 1

| Use | Phosphor |
| --- | --- |
| LED TV BLU | β-SiAlON:$Eu^{2+}$, (Ca,Sr)AlSiN$_3$:$Eu^{2+}$, La$_3$Si$_6$N$_{11}$:$Ce^{3+}$, K$_2$SiF$_6$:$Mn^{4+}$, SrLiAl$_3$N$_4$:Eu, Ln$_{4-x}$(Eu$_z$M$_{1-z}$)$_x$Si$_{12-y}$Al$_y$O$_{3+x+y}$N$_{18-x-y}$ (0.5 ≤ x ≤ 3, 0 < z < 0.3, 0 < y ≤ 4), K$_2$TiF$_6$:$Mn^{4+}$, NaYF$_4$:$Mn^{4+}$, NaGdF$_4$:$Mn^{4+}$, K$_3$SiF$_7$:$Mn^{4+}$ |
| Illumination | Lu$_3$Al$_5$O$_{12}$:$Ce^{3+}$, Ca-α-SiAlON:$Eu^{2+}$, La$_3$Si$_6$N$_{11}$:$Ce^{3+}$, (Ca,Sr)AlSiN$_3$:$Eu^{2+}$, Y$_3$Al$_5$O$_{12}$:$Ce^{3+}$, K$_2$SiF$_6$:$Mn^{4+}$, SrLiAl$_3$N$_4$:Eu, Ln$_{4-x}$(Eu$_z$M$_{1-z}$)$_x$Si$_{12-y}$Al$_y$O$_{3+x+y}$N$_{18-x-y}$ (0.5 ≤ x ≤ 3, 0 < z < 0.3, 0 < y ≤ 4), K$_2$TiF$_6$:$Mn^{4+}$, NaYF$_4$:$Mn^{4+}$, NaGdF$_4$:$Mn^{4+}$, K$_3$SiF$_7$:$Mn^{4+}$ |

TABLE 1-continued

| Use | Phosphor |
|---|---|
| Side Viewing (Mobile Devices, Laptop PCs) | $Lu_3Al_5O_{12}:Ce^{3+}$, $Ca\text{-}\alpha\text{-}SiAlON:Eu^{2+}$, $La_3Si_6N_{11}:Ce^{3+}$, $(Ca,Sr)AlSiN_3:Eu^{2+}$, $Y_3Al_5O_{12}:Ce^{3+}$, $(Sr,Ba,Ca,Mg)_2SiO_4:Eu^{2+}$, $K_2SiF_6:Mn^{4+}$, $SrLiAl_3N_4:Eu$, $Ln_{4-x}(Eu_zM_{1-z})_xSi_{12-y}Al_yO_{3+x+y}N_{18-x-y}$ ($0.5 \leq x \leq 3$, $0 < z < 0.3$, $0 < y \leq 4$), $K_2TiF_6:Mn^{4+}$, $NaYF_4:Mn^{4+}$, $NaGdF_4:Mn^{4+}$, $K_3SiF_7:Mn^{4+}$ |
| Vehicle Headlights (Head Lamps, etc.) | $Lu_3Al_5O_{12}:Ce^{3+}$, $Ca\text{-}\alpha\text{-}SiAlON:Eu^{2+}$, $La_3Si_6N_{11}:Ce^{3+}$, $(Ca,Sr)AlSiN_3:Eu^{2+}$, $Y_3Al_5O_{12}:Ce^{3+}$, $K_2SiF_6:Mn^{4+}$, $SrLiAl_3N_4:Eu$, $Ln_{4-x}(Eu_zM_{1-z})_xSi_{12-y}Al_yO_{3+x+y}N_{18-x-y}$ ($0.5 \leq x \leq 3$, $0 < z < 0.3$, $0 < y \leq 4$), $K_2TiF_6:Mn^{4+}$, $NaYF_4:Mn^{4+}$, $NaGdF_4:Mn^{4+}$, $K_3SiF_7:Mn^{4+}$ |

In addition, as a material of the encapsulation body 405, wavelength conversion materials such as a quantum dot (QD) through a phosphor substitute or being mixed with a phosphor may be used.

Figure 10:
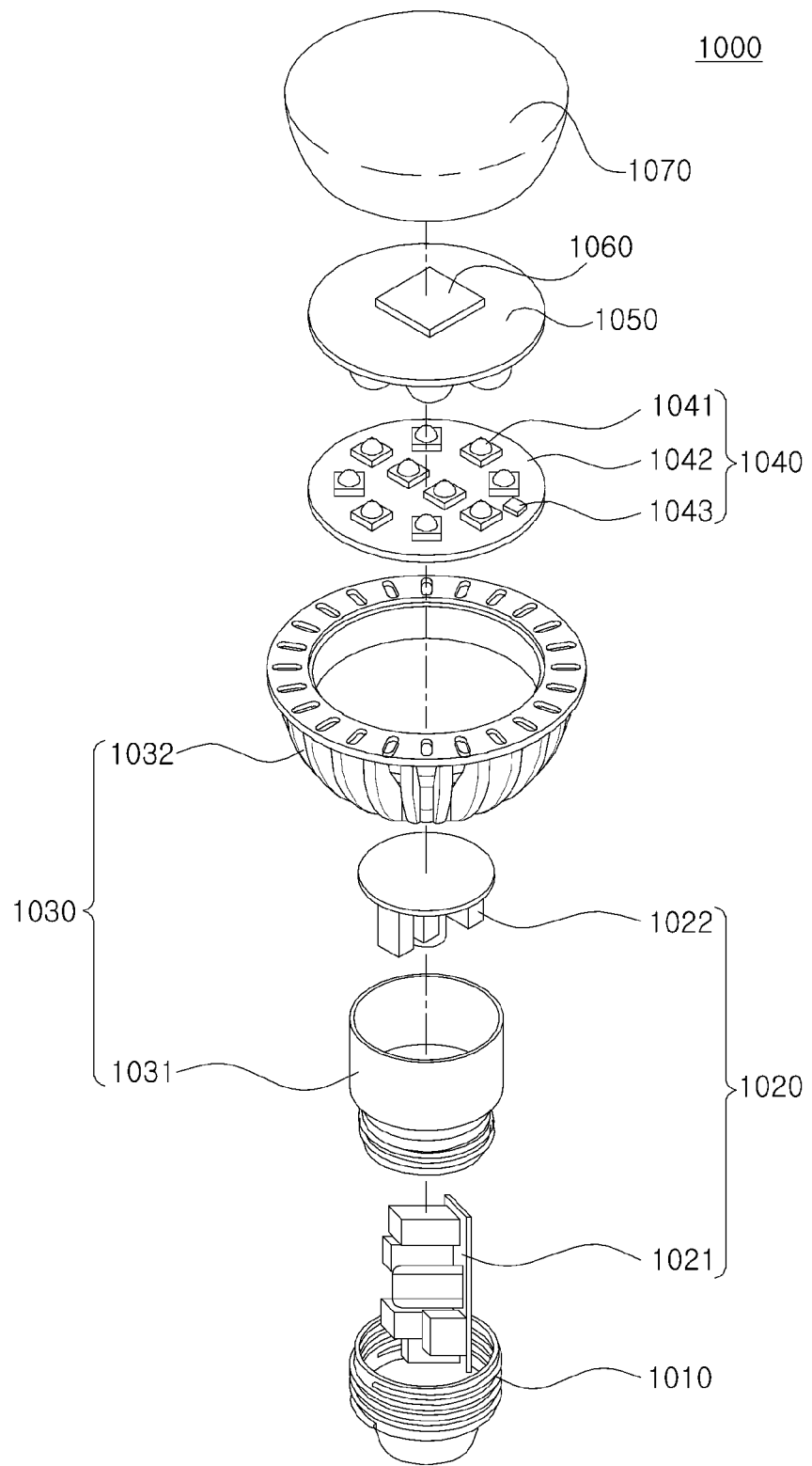
FIGS. 10 and 11 are schematic exploded perspective views of lamps employable as the lighting device of FIG. 1, according to exemplary embodiments.

FIG. 10 is a schematic exploded perspective view of a bulb-type lamp that may be used as a lighting device of FIG. 1, according to an example embodiment.

With reference to FIG. 10, a lighting device 1000 may include a socket 1010, a power supply unit 1020, a heat sink unit 1030, and a light source module 1040, and an optical unit 1070.

Power supplied to the lighting device 1000 may be applied through the socket 1010 thereto. The socket 1010 may be configured to be able to be substituted with an existing lighting device. As illustrated in FIG. 10, the power supply unit 1020 may include a first power supply portion 1021 and a second power supply portion 1022 separated from or coupled to each other. The heat sink unit 1030 may include an internal heat radiation portion 1031 and an external heat radiation portion 1032. The internal heat radiation portion 1031 may be directly connected to the light source module 1040 and/or the power supply unit 1020, by which heat may be transferred to the external heat radiation portion 1032. The optical unit 1070 may be configured to allow light emitted by the light source module 1040 to be uniformly distributed outwardly.

The light source module 1040 may receive power from the power supply unit 1020 to emit light to the optical unit 1070. The light source module 1040 may include one or more light emitting devices 1041, a circuit board 1042, and a controller 1043, and the controller 1043 may store driving information of the light emitting devices 1041 therein.

A reflective plate 1050 may be provided above the light source module 1040. The reflective plate 1050 may allow for uniform spreading of light from a light source sideways and backwards so as to reduce a glare effect of light. The communications module 1060 may be mounted on an upper portion of the reflective plate 1050, and home-network communications may be implemented through the communications module 1060. For example, the communications module 1060 may be a wireless communications module using Zigbee, Wi-Fi, or Li-Fi, and may control illumination of a lighting device installed indoors or outdoors, such as switching on/off, adjustment of brightness, or the like, through a smartphone or a wireless controller. In addition, electronic products in the home or outdoors and automobile systems, such as TV sets, refrigerators, air conditioners, door locks, automobiles, or the like, may be controlled using a Li-Fi communications module that uses a visible light wavelength of a lighting device installed indoors or outdoors. The reflective plate 1050 and the communications module 1060 may be covered by the optical unit 1070.

Figure 11:
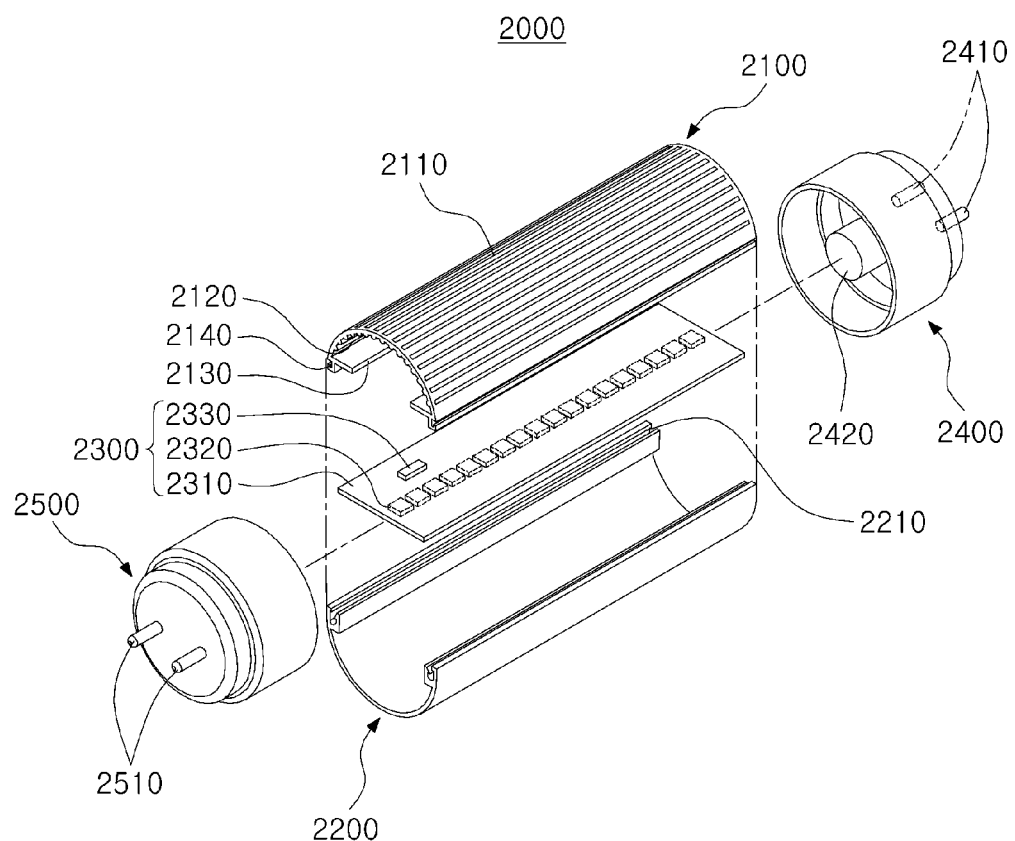

FIG. 11 is an exploded perspective view schematically illustrating a lamp that may be employed in a lighting device of FIG. 1, according to an example embodiment.

With reference to FIG. 11, a lighting device 2000 may include a heat sink member 2100, a cover 2200, a light source module 2300, a first socket 2400, and a second socket 2500.

A plurality of heat radiating fins 2110 and 2120 may be formed on an internal or/and external surface of the heat sink member 2100 in a concave-convex form, and the heat radiating fins 2110 and 2120 may be designed to have various shapes and gaps therebetween. Support portions 2130 having a protrusion form may be formed on an inner side of the heat sink member 2100. The light source module 2300 may be fixed to the support portions 2130. Stop protrusions 2140 may be formed on two ends of the heat sink member 2100, respectively.

A stop groove 2210 may be formed on the cover 2200. The stop groove 2210 may be coupled to the stop protrusion 2140 of the heat sink member 2100 in a hook coupling structure. Positions in which the stop groove 2210 and the stop protrusion 2140 are formed may also be inversely changed.

The light source module 2300 may include a light emitting device array. The light source module 2300 may include a printed circuit board 2310, a light source 2320, and a controller 2330. The light source 2320 may be the semiconductor light emitting device package described above with reference to FIGS. 6 and 7. The controller 2330 may store driving information of the light source 2320 therein. The printed circuit board 2310 may be provided with circuit wirings formed therein, for operating the light source 2320, and may also include constituent elements for operating the light source 2320.

The first and second sockets 2400 and 2500 may be provided as a pair of sockets, and may have a structure in which they are coupled to two ends of a cylindrical cover unit configured of the heat sink member 2100 and the cover 2200. For example, the first socket 2400 may include electrode terminals 2410 and a power supply device 2420, and the second socket 2500 may include dummy terminals 2510 disposed thereon. In addition, an optical sensor and/or a communications module may be disposed inside one of the first socket 2400 or the second socket 2500. For example, the optical sensor and/or the communications module may be installed within the second socket 2500 in which the dummy terminals 2510 are disposed. As another example, an optical sensor and/or a communications module may also be installed within the first socket 2400 in which the electrode terminals 2410 are disposed.

As set forth above, according to example embodiments, a lighting control system able to control a plurality of lighting devices may be provided. Also, according to example embodiments, a lighting control method in which the plurality of lighting devices may be easily controlled may be provided.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in FIG. 2, e.g., the lighting controller 111 and the terminal controller 211, may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

While example embodiments have been shown and described above, it will be apparent to those skilled in the art that modifications and variations could be made without departing from the scope of the inventive concept as defined by the appended claims.

What is claimed is:

1. A lighting device comprising:
a lighting unit;
a communication interface configured to receive a control signal generated at an external device directly from the external device or by way of another lighting device in a network of a plurality of lighting devices comprising the lighting device and the other lighting device, depending on a connection relationship between the plurality of lighting devices;
a memory configured to store information about the lighting device; and
a controller configured to, according to the control signal and the information about the lighting device, selectively perform one of directly controlling an operation of the lighting unit and transmitting the control signal to the network through the communication interface so that the control signal is relayed to at least one other lighting device in the network through the communication interface for the external device to indirectly control an operation of at least one target lighting device included in the network by way of the lighting device.

2. The lighting device of claim 1, wherein in response to the control signal indicating that the control signal is directed to the lighting device, the controller is configured to directly control the operation of the lighting device, and
wherein in response to the control signal indicating that the control signal is directed to the at least one target lighting device, the controller is configured to transmit the control signal to the network so that the control signal is relayed to the at least one other lighting device in the network through the communication interface for the external device to indirectly control the operation of the at least one target lighting device included in the network by way of the lighting device.

3. The lighting device of claim 2, wherein the operation of the lighting unit or the at least one target lighting device comprises adjusting at least one of color, color temperature, brightness and chroma of light emitted from the lighting unit or a lighting unit of the at least one target lighting device, respectively.

4. The lighting device of claim 1, wherein the memory is configured to store identification information about the lighting device, and
wherein the controller is further configured to transmit the identification information to the external device through the communication interface for the external device to identify the lighting device.

5. The lighting device of claim 4, wherein the controller is further configured to receive and relay identification information about the at least one other lighting device to the external device through the communication interface for the external device to identify the at least one other lighting device.

6. The lighting device of claim 1, wherein the at least one other lighting device is the at least one target lighting device.

7. The lighting device of claim 1, wherein the communication interface is configured to receive the control signal directly from the external device using a data channel, and receive the control signal by way of the other lighting device using an advertising channel different from the data channel.

8. The lighting device of claim 1, wherein the memory is further configured to store a password required for another external device to use to access the lighting device to control the operation of the lighting unit or another lighting device included in the network, the password being received from the external device.

9. The lighting device of claim 1, wherein the information about the lighting device comprises group identification information about a group comprising the lighting device and another lighting device included in the network, the group identification information being generated by the external device, and
wherein the controller is further configured to determine whether the control signal is directed to the group to control an operation of the group or another group comprising the at least one target lighting device to control an operation of the other group.

10. The lighting device of claim 1, wherein the network is a mesh network, and the control signal is directly received at the communication interface from the external device using a Bluetooth™ low energy protocol.

11. The lighting device of claim 1, wherein, when control signals are received from a plurality of external devices including the external device, the controller is configured to select the control signal generated at the external device, among the control signals, to selectively perform one of the controlling the operation of the lighting unit and the transmitting the control signal to the network so that the control signal is relayed to the at least one other lighting device based on priority information set to each of the plurality of external devices and stored in the memory.

12. A method of controlling at least one lighting device in a network comprising a plurality of lighting devices, the method comprising:
    receiving, at a lighting device included in the network, a control signal generated at an external device directly from the external device or by way of another lighting device included in the network, depending on a connection relationship between the plurality of lighting devices;
    storing information about the lighting device in a memory of the lighting device; and
    according to the control signal and the information about the lighting device, selectively performing one of directly controlling an operation of the lighting unit and transmitting the control signal to the network so that the control signal is relayed to at least one other lighting device in the network for the external device to indirectly control an operation of at least one target lighting device included in the network by way of the lighting device.

13. The method of claim 12, wherein in response to the control signal indicating that the control signal is directed to the lighting device, the operation of the lighting device is directly controlled, and
    wherein in response to the control signal indicating that the control signal is directed to the at least one target lighting device, the control signal is transmitted to the network so that the control signal is relayed to the at least one other lighting device in the network for the external device to indirectly control the operation of the at least one target lighting device included in the network by way of the lighting device.

14. The method of claim 13, wherein the operation of the lighting device or the at least one target lighting device comprises adjusting at least one of color, color temperature, brightness and chroma of light emitted from the lighting device or the at least one target lighting device, respectively.

15. The method of claim 12, wherein the information about the lighting device comprises identification information about the lighting device, and
    wherein the method further comprises transmitting the identification information to the external device for the external device to identify the lighting device.

16. The method of claim 15, further comprising relaying identification information about the at least one other lighting device included in the network to the external device for the external device to identify the at least one other lighting device.

17. The method of claim 12, wherein the at least one other lighting device is the at least one target lighting device.

18. The method of claim 12, wherein when the control signal is received directly from the external device, a data channel is used, and
    wherein when the control signal is received by way of the other lighting device, an advertising channel different from the data channel is used.

19. The method of claim 12, further comprising storing a password required for another external device to use to access the lighting device to control the operation of the lighting device or another lighting device included in the network, the password being received from the external device.

20. The method of claim 12, wherein the information about the lighting device comprises group identification information about a group comprising the lighting device and another lighting device included in the network, the group identification information being generated by the external device, and
    wherein the method further comprises determining whether the control signal is directed to the group to control an operation of the group or another group comprising the at least one target lighting device to control an operation of the other group.

21. The method of claim 12, wherein the network is a mesh network, and the control signal is directly received at the communication interface from the external device using a Bluetooth™ low energy protocol.

22. The method of claim 12, further comprising selecting the control signal generated at the external device, among control signals received from a plurality of external devices including the external device, to selectively perform one of the controlling the operation of the lighting unit and the transmitting the control signal to the network so that the control signal is relayed to the at least one other lighting device based on priority information set to each of the plurality of external devices and stored in the memory.

23. A non-transitory computer readable medium having recorded thereon instructions executable by a processor of an external device to perform a method comprising:
    searching for a lighting device in a network comprising a plurality of lighting devices which is to be connected to the external device;
    generating a control signal which selectively controls one of an operation of the lighting device and an operation of at least one target lighting device connected to the lighting device in the network; and
    transmitting the control signal directly to the lighting device,
    wherein, in response to the control signal indicating that the control signal is directed to the lighting device, the operation of the lighting device is directly controlled, and
    wherein, in response to the control signal indicating that the control signal is directed to the at least one target lighting device, the control signal is transmitted to the network so that the control signal is relayed to the at least one other lighting device in the network for the external device to indirectly control the operation of the at least one target lighting device by way of the lighting device.

24. The non-transitory computer readable medium of claim 23, further comprising:
    receiving signals respectively generated from two or more lighting devices in the network;
    comparing strengths of the signals one another; and
    selecting the lighting device which has transmitted a signal having a highest strength among the signals to directly transmit the control signal to the lighting device.

25. The non-transitory computer readable medium of claim 23, further comprising receiving and storing, at a memory of the external device, identification information about each of the plurality of lighting devices,
    wherein the control signal is generated based on the identification information.

26. The non-transitory computer readable medium of claim 25, further comprising:
- generating group identification information identifying a plurality of groups, each group comprising one or more lighting devices included in the network; and
- transmitting the group identification information to the plurality of lighting devices through the lighting device,
- wherein the control signal is used to selectively control one of an operation of a group comprising the lighting device and an operation of another group comprising the at least one target lighting device.

27. The non-transitory computer readable medium of claim 23, further comprising:
- generating at least one password required for another external device to use to access the lighting device to control the operation of the lighting device or another lighting device included in the network; and
- transmitting the at least one password to the plurality of lighting devices through the lighting device.

* * * * *